United States Patent [19]
Sakota

[11] Patent Number: 5,895,584
[45] Date of Patent: Apr. 20, 1999

[54] MOVABLE ELECTRODE STRUCTURE OF RESISTANCE WELDING APPARATUS FOR NUT

[75] Inventor: Kouji Sakota, Hiroshima, Japan

[73] Assignee: Seki Kogyo Co., Ltd., Hiroshima, Japan, JPX

[21] Appl. No.: 08/883,964

[22] Filed: Jun. 27, 1997

[30] Foreign Application Priority Data

Jul. 31, 1996 [JP] Japan .................... 8-202318

[51] Int. Cl.⁶ .................................... B23K 11/30
[52] U.S. Cl. .................... 219/86.24; 219/93; 219/89
[58] Field of Search .................. 219/86.24, 86.31, 219/89, 93, 119, 120, 157

[56] References Cited

U.S. PATENT DOCUMENTS

| | | | |
|---|---|---|---|
| 2,004,620 | 6/1935 | Tarbox | 219/89 |
| 2,086,784 | 7/1937 | Taylor | 219/89 |
| 3,573,423 | 4/1971 | Medlin | 219/119 |
| 3,657,509 | 4/1972 | Beneteau | 219/120 |
| 4,020,316 | 4/1977 | Schaft et al. | 219/103 |
| 4,609,805 | 9/1986 | Tobita et al. | 219/93 |
| 4,754,116 | 6/1988 | Naruse et al. | 219/78.01 |
| 4,789,768 | 12/1988 | Tobita et al. | 219/78.01 |
| 5,146,062 | 9/1992 | Koda et al. | 219/93 |
| 5,471,029 | 11/1995 | Simmons | 219/120 |

FOREIGN PATENT DOCUMENTS

| | | | |
|---|---|---|---|
| 6-238460 | 8/1994 | Japan | 219/93 |
| 6-238461 | 8/1994 | Japan . | |
| 6-246460 | 9/1994 | Japan | 219/93 |
| 6-320288 | 11/1994 | Japan | 219/93 |

*Primary Examiner*—Gregory L. Mills
*Attorney, Agent, or Firm*—Sixbey, Friedman, Leedom & Ferguson, P.C.; Gerald J. Ferguson, Jr.

[57] ABSTRACT

A guide pin of a movable electrode is inserted into a hole of a nut fed to an intermediate position between a fixed electrode and the movable electrode, and the movable electrode is then moved down together with the nut to position the nut on a portion to be welded of a workpiece overlying the fixed electrode. An air passage is formed inside of the guide pin. A plurality of air outlets are formed on the periphery of the tip of the guide pin. A pressurized air is supplied to the air passage and is then blown out of the air outlets, so that a blow of the pressurized air is given to the bottom surface of the nut thereby preventing fallout of the nut.

3 Claims, 11 Drawing Sheets

5,895,584

MOVABLE ELECTRODE STRUCTURE OF RESISTANCE WELDING APPARATUS FOR NUT

BACKGROUND OF THE INVENTION

This invention relates to a movable electrode structure of a resistance welding apparatus for nut with which a nut is welded on a workpiece.

Japanese Patent Application Laid-Open Gazette No. 6-238461 discloses an example of a resistance welding apparatus for nut. This apparatus includes a fixed electrode, a movable electrode placed above the fixed electrode, and a nut feeding means for feeding a nut to a position between the fixed and movable electrodes. The movable electrode is provided with a guide pin which protrudes downward so as to be inserted into a hole of a nut. The nut feeding means is for holding a nut on a nut seat provided on the front end of a rod and feeding the nut to the position between the fixed and movable electrodes. The nut seat is supported to the tip of the rod so as to be swingable between a position that a seat face for holding the nut is substantially horizontal and a position that the nut seat is dangled, and is urged by an urging means so that the seat face is substantially horizontal.

In the above resistance welding apparatus, when a nut is fed below the movable electrode, the movable electrode moves down to insert the guide pin into the hole of the nut, forcedly dangle the nut seat and then position the nut on a portion to be welded of the workpiece overlying the fixed electrode. Since the nut is only fitted on the guide pin when the movable electrode receives the nut from the nut feeding means and moves down, the movable electrode is set at a falling speed greater than the speed of free fall of the nut so that the nut cannot fall out of the guide pin.

The guide pin is urged in a direction of protruding from the body of the movable electrode by a spring. Thus, the guide pin contacts a positioning pin of the fixed electrode to retract in the movable electrode while the nut and the workpiece are sandwiched between the fixed and movable electrodes and are welded, whereas the guide pin protrudes from the movable electrode by the urge of the urging means when the movable electrode moves upward after the welding.

In the case that the movable electrode has a long falling stroke after receiving the nut from the nut feeding means, however, the falling speed of the movable electrode must be set considerably great in order to fall the movable electrode at a speed faster than the speed of free fall. This makes it difficult to smoothly carry out an operation of transferring the nut from the nut feeding means to the guide pin of the movable electrode and makes it difficult to smoothly position the nut onto the workpiece overlying the fixed electrode.

In addition, though the workpiece having the welded nut must be lifted and shifted to a different position for the next welding work, the guide pin immediately protrudes when the movable electrode rises after the welding. Therefore, when the workpiece is promptly lifted and shifted to a different position according to the rise of the movable electrode, the previously welded nut may be caught on the protruding guide pin. Thus, the guide pin interferes with a prompt welding work.

SUMMARY OF THE INVENTION

The present invention is directed to provide a movable electrode structure of a resistance welding apparatus for nut capable of solving the above problems.

More specifically, an object of the invention is to prevent a nut from falling out of a guide pin even when the falling speed of a movable electrode is reduced thereby making it possible to extend a falling stroke of the movable electrode between a nut feeding means and a portion to be welded of a workpiece, and to set the falling speed of the movable electrode at a speed suitable for smooth receipt of the nut from the nut feeding means or at a speed suitable for positioning of the nut onto the portion to be welded of the workpiece.

Another object of the invention is to eliminate the problem of protrusion of a guide pin after welding thereby realizing a prompt, smooth welding work.

Still another object of the invention is to realize a smooth operation of a nut feeding means by making an arrangement capable of blowing off dusts on a nut and a cylinder part when a movable electrode receives the nut from the nut feeding means, and to securely weld the nut on a workpiece.

The Inventor has found the fact that if a pressurized air is blown out of the periphery of the guide pin of the movable electrode so as to give a blow of the air to the bottom surface of the nut, the nut can be held on the guide pin without falling out of the guide pin and thus the movable electrode can move down at a speed smaller than the speed of free fall, and based on the finding has completed the present invention.

An aspect of the present invention premises a resistance welding apparatus for nut comprising a fixed electrode, a movable electrode placed above the fixed electrode and nut feeding means for feeding a nut to a position between the fixed and movable electrodes, the movable electrode including a guide pin which protrudes downward to be inserted into a hole of a nut, the nut feeding means including a nut seat swingable between a position that a seat face for holding the nut is substantially horizontal and a dangled position and urging means for urging the nut seat into the position that the seat face is substantially horizontal, in which when the nut is held on the nut seat of the nut feeding means and is fed to the position between the fixed and movable electrodes, the movable electrode is moved down to insert the guide pin into the hole of the nut, forcedly dangle the nut seat and then position the nut on a portion to be welded of a workpiece overlying the fixed electrode.

In such a resistance welding apparatus for nut, an air passage through which a pressurized air is supplied is formed inside of the guide pin of the movable electrode, the guide pin is provided with a plurality of air outlets which extend from the air passage to respective openings on the periphery of the tip of the guide pin and through which air blows are given to the bottom surface of the nut to prevent the nut from falling out of the guide pin, and an air supply is connected to the movable electrode and supplies a pressured air to the air passage. Thereby, the pressurized air is blown out of the air outlets so that air blows are given to the bottom surface of the nut into which the guide pin is inserted.

Accordingly, while the movable electrode moves down to receive a nut from the nut feeding means, i.e., inserts the guide pin into the hole of the nut, and continues to move down, the nut is kept held on the guide pin by air blows from the air outlets. This prevents the nut from falling out of the guide pin even when the falling speed of the movable electrode is smaller than the speed of free fall.

Another aspect of the present invention premises a resistance welding apparatus for nut comprising a fixed electrode, a movable electrode placed above the fixed electrode and nut feeding means for feeding a nut to a position between the fixed and movable electrodes, the movable electrode including a guide pin which protrudes downward to be inserted into a hole of a nut, the nut feeding means including a nut seat swingable between a position that a seat face for holding a nut is substantially horizontal and a dangled position, and urging means for urging the nut seat into the position that the seat face is substantially horizontal, in which when the nut is held on the nut seat of the nut feeding means and is fed to the position between the fixed and movable electrodes, the movable electrode is moved down to insert the guide pin into the hole of the nut, forcedly dangle the nut seat and then position the nut on a portion to be welded of a workpiece overlying the fixed electrode.

In such a resistance welding apparatus for nut, a movable electrode structure comprises: an electrode body capable of contact with the top surface of the nut; a cylinder part which is formed at a lower part of the electrode body, has an opening formed on the bottom surface of the electrode body and houses the guide pin in such a way that the guide pin is retractable in and protrudable from the opening; urging means for urging to retract the guide pin in the cylinder part; and an air supply which is connected to the cylinder part and supplies a pressurized air to the top surface of the guide pin to protrude the guide pin from the opening at the lower end of the cylinder part against the urge of the urging means.

In this arrangement, the supply of a pressurized air to the cylinder part of the electrode body causes the guide pin to protrude from the cylinder part. This makes it possible to insert the guide pin into the hole of the nut on the nut feeding means and position the nut onto a portion to be welded of the workpiece. Thereafter, when the supply of the pressurized air is stopped, it is possible to retract the guide pin in the cylinder part by the urge of the urging means. Hence, when the workpiece is lifted and shifted sideward at the same time as the rise of the movable electrode after the welding of the nut, it can be prevented that the workpiece or the welded nut is caught on the guide pin.

Still another aspect of the present invention premises a resistance welding apparatus for nut comprising a fixed electrode, a movable electrode placed above the fixed electrode and nut feeding means for feeding a nut to a position between the fixed and movable electrodes, the movable electrode including a guide pin which protrudes downward to be inserted into a hole of a nut, the nut feeding means including a nut seat swingable between a position that a seat face for holding a nut is substantially horizontal and a dangled position, and urging means for urging the nut seat into the position that the seat face is substantially horizontal, in which when the nut is held on the nut seat of the nut feeding means and is supplied to the position between the fixed and movable electrodes, the movable electrode is moved down to insert the guide pin into the hole of the nut, forcedly dangle the nut seat and then position the nut on a portion to be welded of a workpiece overlying the fixed electrode.

In such a resistance welding apparatus for nut, a movable electrode structure comprises an electrode body capable of contact with the top surface of the nut, a cylinder part which is formed at a lower part of the electrode body, has an opening formed on the bottom surface of the electrode body and houses the guide pin in such a way that the guide pin is retractable in and protrudable from the opening, and urging means for urging the guide pin in the cylinder part, an air passage through which a pressurized air is supplied is formed inside of the guide pin of the movable electrode, the guide pin is provided with a plurality of air outlets which extend from the air passage to respective openings on the periphery of the tip of the guide pin and through which air blows are given to the bottom surface of the nut to prevent the nut from falling out of the guide pin, and a pressurized-air inlet through which a pressurized air is supplied to the air passage of the guide pin is formed on the top surface of the guide pin.

Accordingly, when a pressurized air is supplied to the cylinder part, the pressurized air acts on the top surface of the guide pin to protrude the guide pin against the urge of the urging means and the pressurized air is supplied to the air passage of the guide pin and is blown out of the air outlets on the periphery of the tip of the guide pin. Thereby, it can be prevented that the nut falls out of the guide pin during the falling of the movable electrode. Further, when the supply of the pressurized air is stopped after the welding, the guide pin retracts in the cylinder part. This implements a prompt, smooth operation of changing portion to be welded of the workpiece.

Still another aspect of the present invention premises the resistance welding apparatus for nut in which a pressurized air is supplied to the top surface of the guide pin as described above. In such a resistance welding apparatus for nut, a movable electrode structure is characterized in that a small clearance is formed between the outer periphery of the guide pin and the inner periphery of the cylinder part so that a part of the pressurized air passes therethrough and is then blown out of the opening at the lower end of the cylinder part.

Accordingly, when a pressurized air is supplied to the cylinder part, a part of the pressurized air blows out of the opening at the lower end of the cylinder part, so that the nut fed by the nut feeding means can be transferred to the movable electrode while dusts depositing on the nut and the cylinder part are blown off.

DESCRIPTION OF THE PREFERRED EMBODIMENTS

Overview

Figure 1:
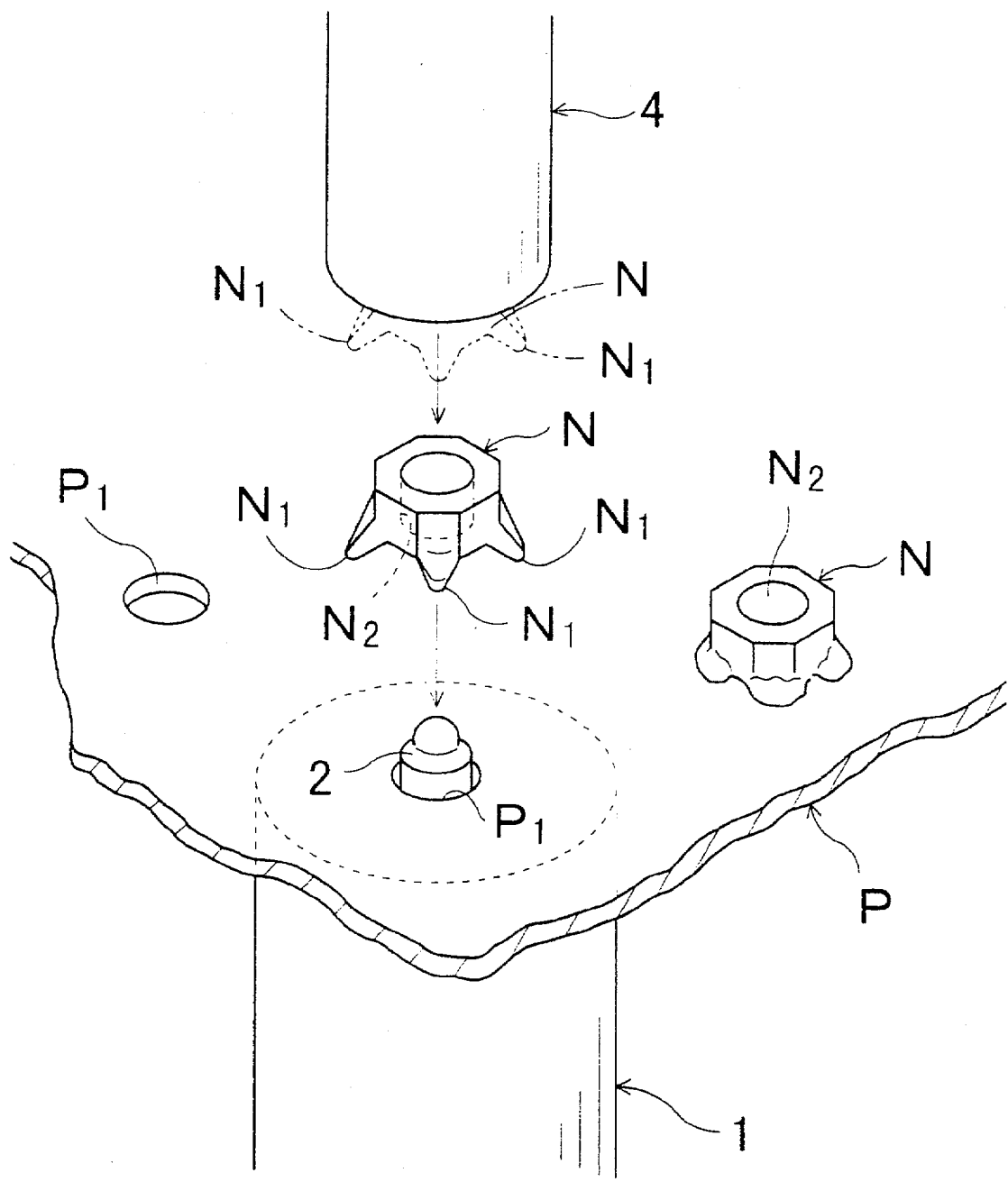
FIG. 1 is a perspective view showing a part of a resistance welding apparatus for nut according to an embodiment of the present invention.

FIG. 1 shows electrodes of a resistance welding apparatus for nut (projection welding apparatus) according to an embodiment of the present invention. The welding apparatus comprises a columnar copper-made fixed electrode 1 whose top surface is formed into a part for pressing and electric conduction, and a columnar copper-made movable electrode 4 whose bottom surface is formed into a part for pressing and electric conduction. The movable electrode 4 is placed above the fixed electrode 1 so as to be capable of rising and falling by a cylinder (not shown), that is, is opposed to the fixed electrode 1 so as to be capable of coming close to and away from the fixed electrode 1. When the movable electrode 4 is in its rising most position, the workpiece (panel) P is put on the top surface of the fixed electrode 1 and a nut N is then supplied to an intermediate position between the workpiece P and the movable electrode 4. In this state, as the movable electrode 4 is moved downward, the nut N is held by the movable electrode 4, the nut N is positioned on a portion to be welded of the workpiece P, and the nut N and the workpiece P are then sandwiched and pressed between both the electrodes 1, 4. Thereafter, a welding current is passed between both the electrodes 1, 4 so that the nut N and the workpiece P are welded by a heat of contact resistance.

The workpiece P has a plurality of mounting holes P1, P1, . . . drilled in places. The nut N is a nut in which projections N1, N1, . . . as parts to be melded are respectively formed at corners on its surface contacting the workpiece P, and is designed to be welded at the projections N1, N1, . . . onto the workpiece P in a state that a hole N2 of the nut N is adjusted to the mounting hole P1 of the workpiece P.

Fixed electrode

A guide pin 2 is supported to the center of the fixed electrode 1 so as to be retractable in and protrudable from the top surface of the fixed electrode 1. The protruding height of the guide pin 2 from the top surface of the workpiece is smaller than the length of the hole N2 of the nut N. The workpiece P is set on the fixed electrode 1 in a state that the mounting hole P1 is fitted on the tip of the guide pin 2.

Movable electrode

Figure 2:
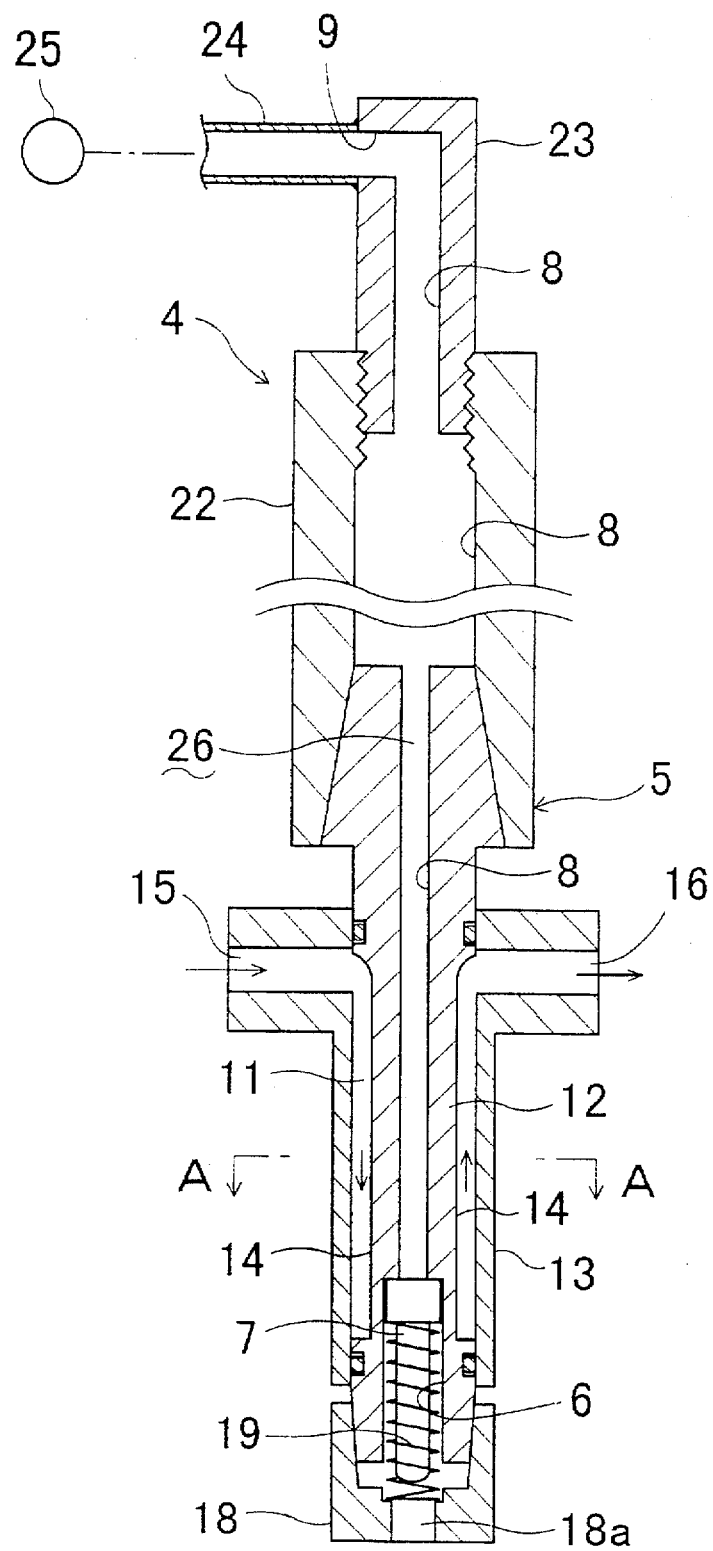
FIG. 2 is a vertical cross section showing the structure of a movable electrode of the welding apparatus.

As shown in FIG. 2, the movable electrode 4 includes a columnar electrode body 5 having a vertical central axis, and a guide pin 7 housed in a cylinder part 6 formed at the bottom of the electrode body 5.

The electrode body 5 is provided at a lower part thereof with an inner cylinder 12, an outer cylinder 13 fitted on the inner cylinder 12 and a columnar electrode tip 18 attached to the bottom end (tip) of the inner cylinder 12. The electrode tip 18 is fitted on the electrode body 5 in a detachable and exchangeable manner by the fitting through tapered construction. The cylinder part 6 is composed of a large-diameter axial hole formed along the central axis at a lower part of the inner cylinder 12, and a central hole 18a of the electrode tip 18. The lower end of the cylinder part 6 is an opening formed on the bottom surface of the electrode tip 18. The cylinder part 6 is communicated at an upper end thereof with a small-diameter air supply passage 8 formed along the central axis at an upper part of the inner cylinder 12.

The guide pin 7 is housed in the cylinder part 6 so as to be retractable in and protrudable from the opening at the lower end of the cylinder part 6. The guide pin 7 has a large-diameter head 7a formed at its top end, and is urged to retract in the cylinder part 6 by a spring (urging means) 19 interposed between the head 7a and a step formed at the upper end of the central hole 18a of the electrode tip 18.

Figure 3:
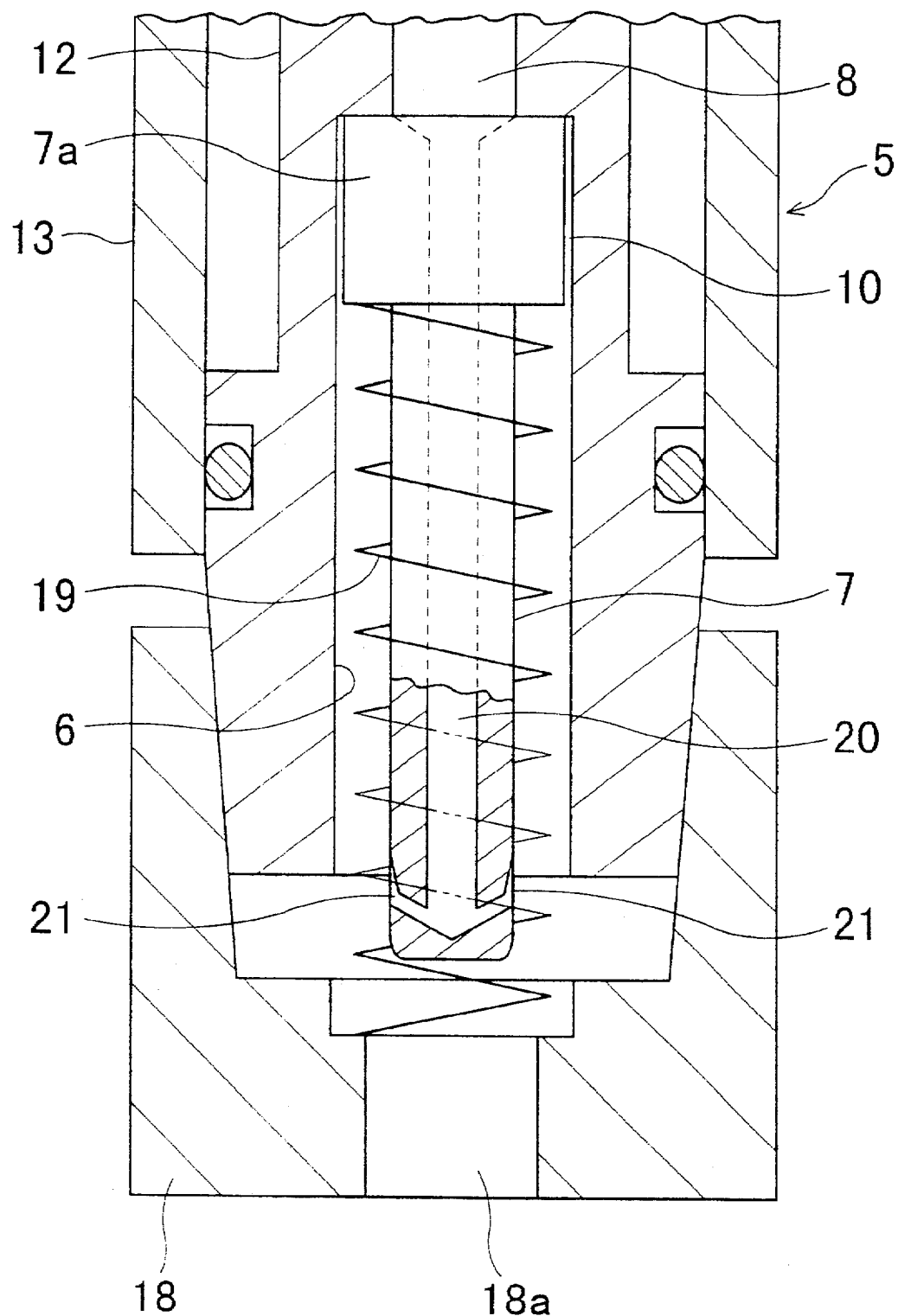
FIG. 3 is an enlarged vertical cross section showing a part of the movable electrode.
Figure 4:
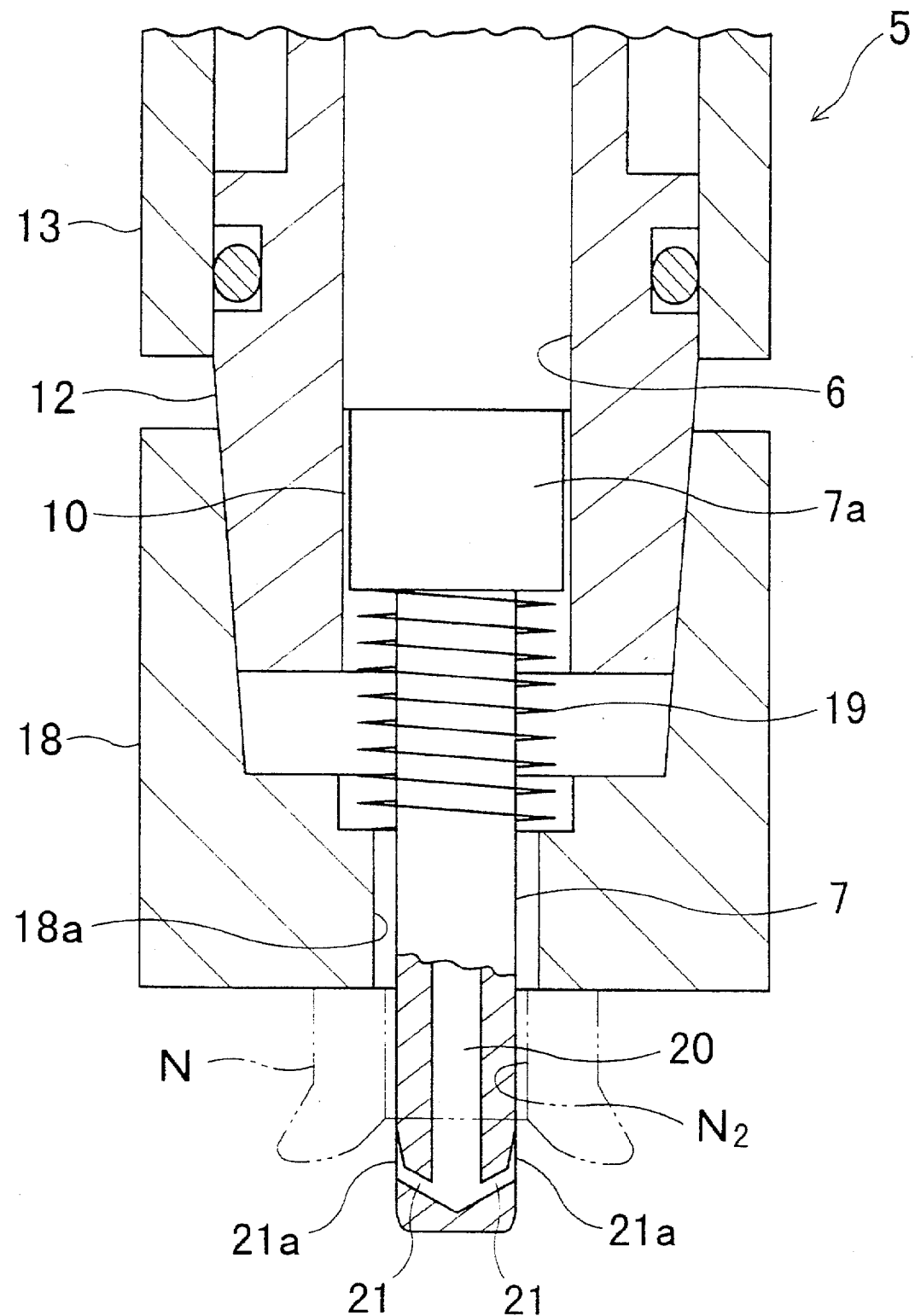
FIG. 4 is an enlarged vertical cross section showing a state that a guide pin of the movable electrode holds a nut.
Figure 5:
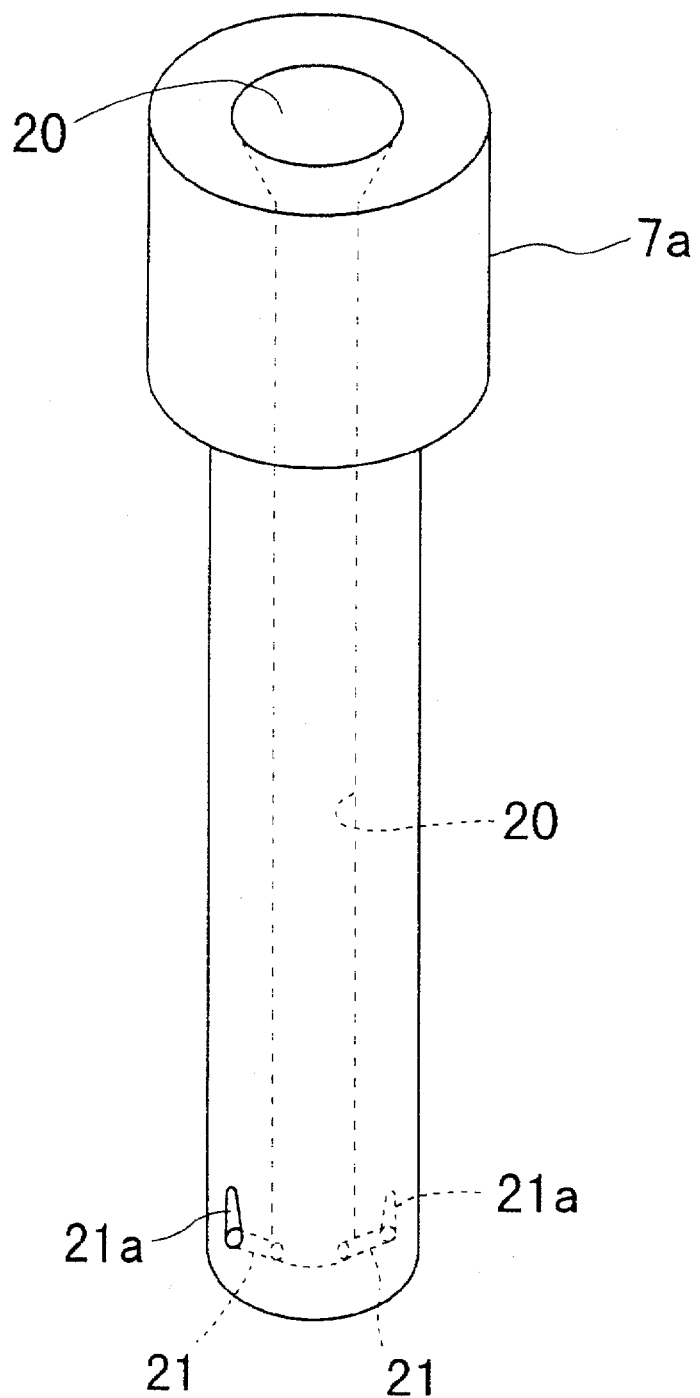
FIG. 5 is a perspective view of the guide pin.

As shown in FIGS. 3 and 4 in an enlarged manner, the guide in 7 is provided on its axis with an air passage 20 whose upper end is open at the top surface of the guide pin 7 and whose lower end is closed. In the tip of the guide pin 7, two air outlets 21, 21 communicated with the air passage 20 are formed. The air outlets 21, 21 extend inclinatorily upward from the lower end of the air passage 20 and have respective openings located at diametrically opposed positions on the periphery of the tip of the guide pin 7. Also as shown in FIG. 5, the upper end of the opening of each air outlet 21 is cut out inclinatorily upward into a guide notch 21a for guiding an air upward.

The outer diameter of the head 7a of the guide pin 7 is slightly smaller than the inner diameter of the cylinder part 6. Therefore, a part of a pressurized air supplied to the cylinder part 6 through the air supply passage 8 passes through a small clearance 10 created between the head 7a of the guide pin 7 and the cylinder part 6 and then blows out of the opening at the lower end of the cylinder part 6.

The inner cylinder 12 is communicated at the top thereof with an upper cylinder 23 through an intermediate cylinder 22. The upper cylinder 23 is communicated at an air inlet 9 thereof with an air supply 25 for supplying a pressurized air through an air pipe 24. The air pipe 24 is connected to a selector valve (not shown) selectable between supply and discharge of an air.

Figure 6:
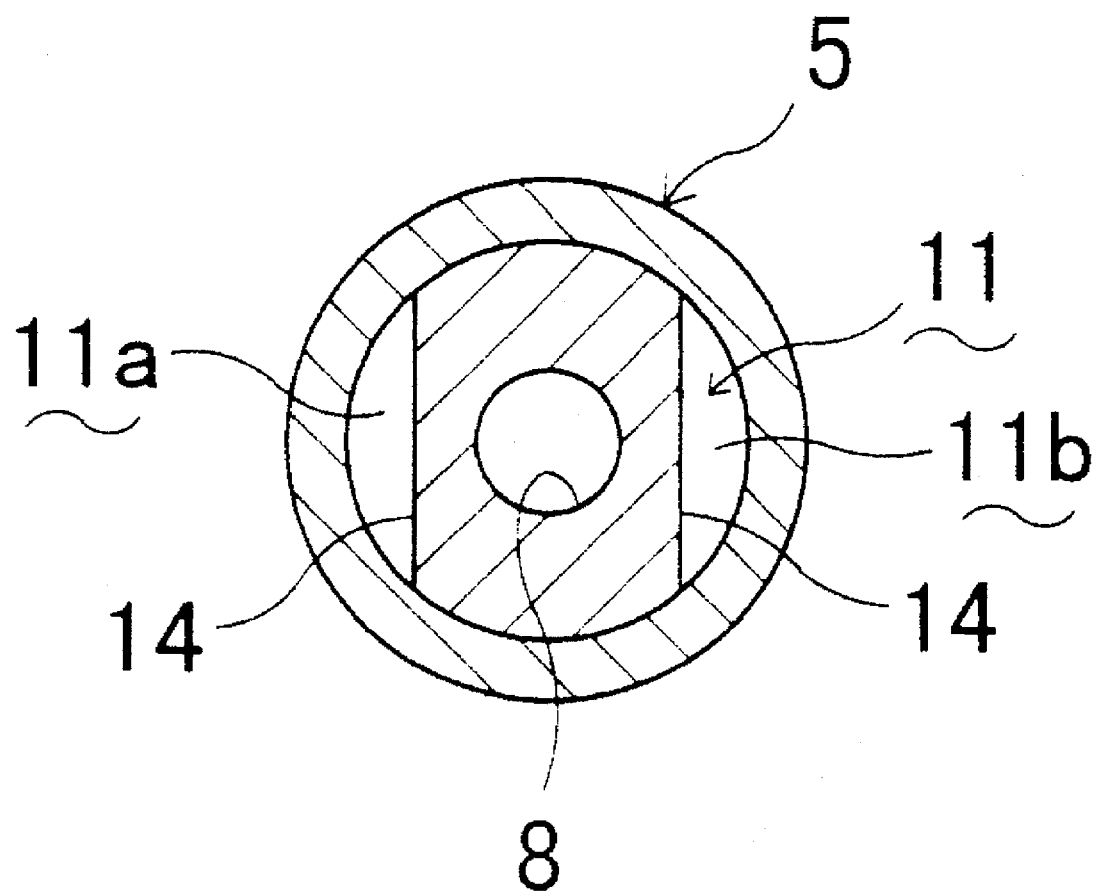
FIG. 6 is a cross section taken along the A-A line of FIG. 2.

A cooling-water passage 11 is formed between the inner cylinder 12 and the outer cylinder 13. More specifically, also as shown in FIG. 6, the inner cylinder 12 is carved at diametrically opposed peripheral portions thereof over a specific vertical length range to form carved parts 14, 14. A forward path 11a of the cooling-water passage 11 is provided between one of the carved parts 14 and the outer cylinder 13, while a return path 11b of the cooling-water passage 11 is provided between the other carved part 14 and the outer cylinder 13. The inner cylinder 12 is carved annually at the lower ends of the carved parts 14, 14 over the entire outer periphery so that the forward and return paths 11a, 11b of the cooling-water passage 11 are communicated with each other. The outer cylinder 13 is provided at an upper end thereof with a suction inlet 15 communicated with the forward path 11a of the cooling-water passage 11 and a drain outlet 16 communicated with the return path 11b. A cooling water supplied through the suction inlet 15 is passed through the forward path 11a of the cooling-water passage 11 and is then drained from the drain outlet 16 through the return path 11b, so that the inner cylinder 12 and the electrode tip 18 are cooled.

Nut feeding means

Figure 7:
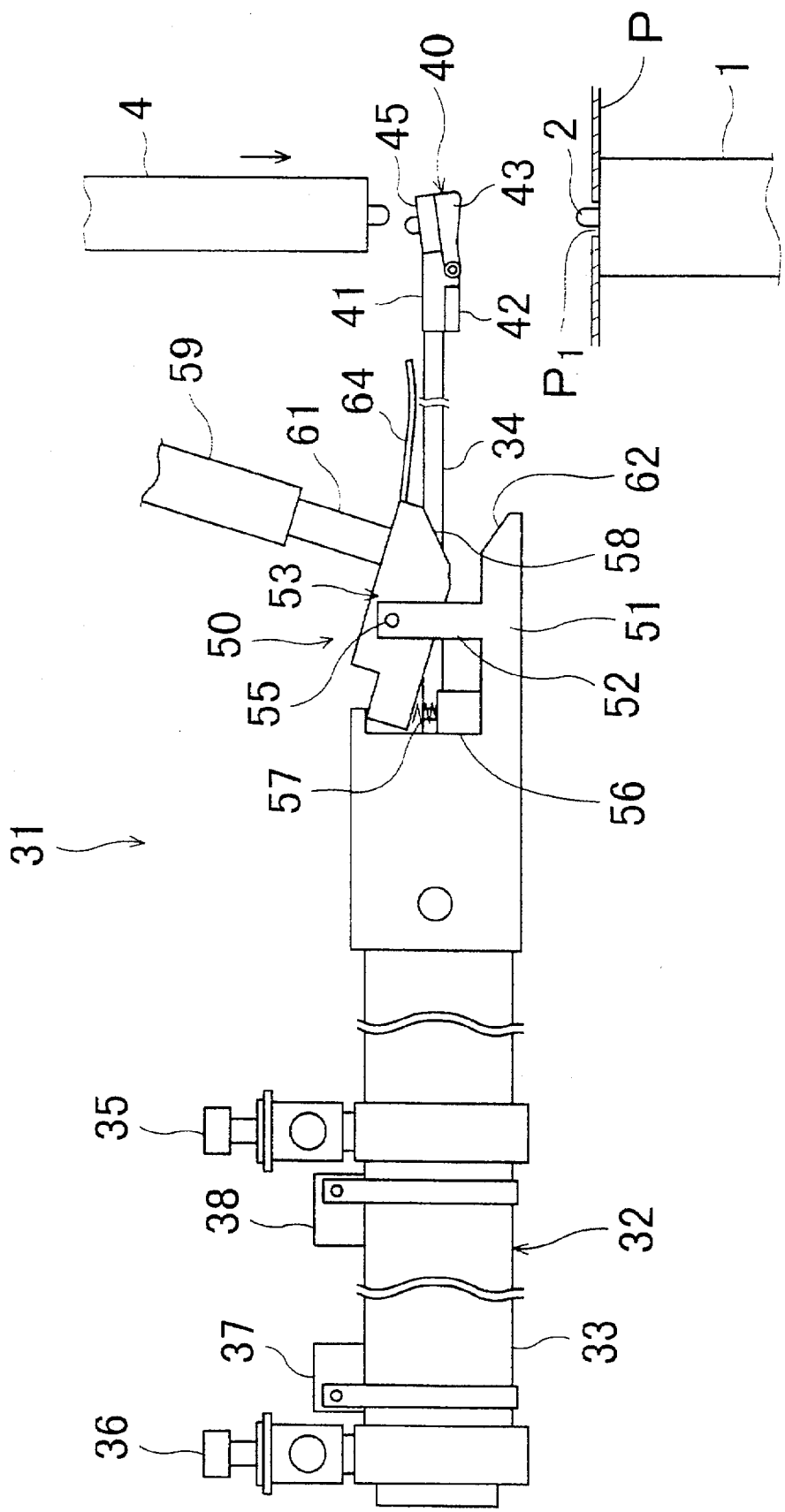
FIG. 7 is a front view showing the entire structure of a nut feeding unit.

FIG. 7 shows a nut feeding unit 31 for feeding a nut N to a position between the fixed electrode 1 and the movable electrode 4. The nut feeding unit 31 has an air cylinder 32. The air cylinder 32 includes a horizontally extending cylinder body 33, and a piston rod 34 which protrudes from the cylinder body 33 and whose front end can move forward to the position below the movable electrode 4 in its rising most position. In FIG. 7, reference numeral 35 denotes an air inlet through which an air for retracting the piston rod 34 is supplied, reference numeral 36 denotes an air inlet through which an air for extending the piston rod 34 is supplied, reference numeral 37 denotes a proximity switch for sensing the rear end of the retracted piston rod 34, and reference numeral 38 denotes a proximity switch for sensing the rear end of the extended piston rod 34.

Figure 8:
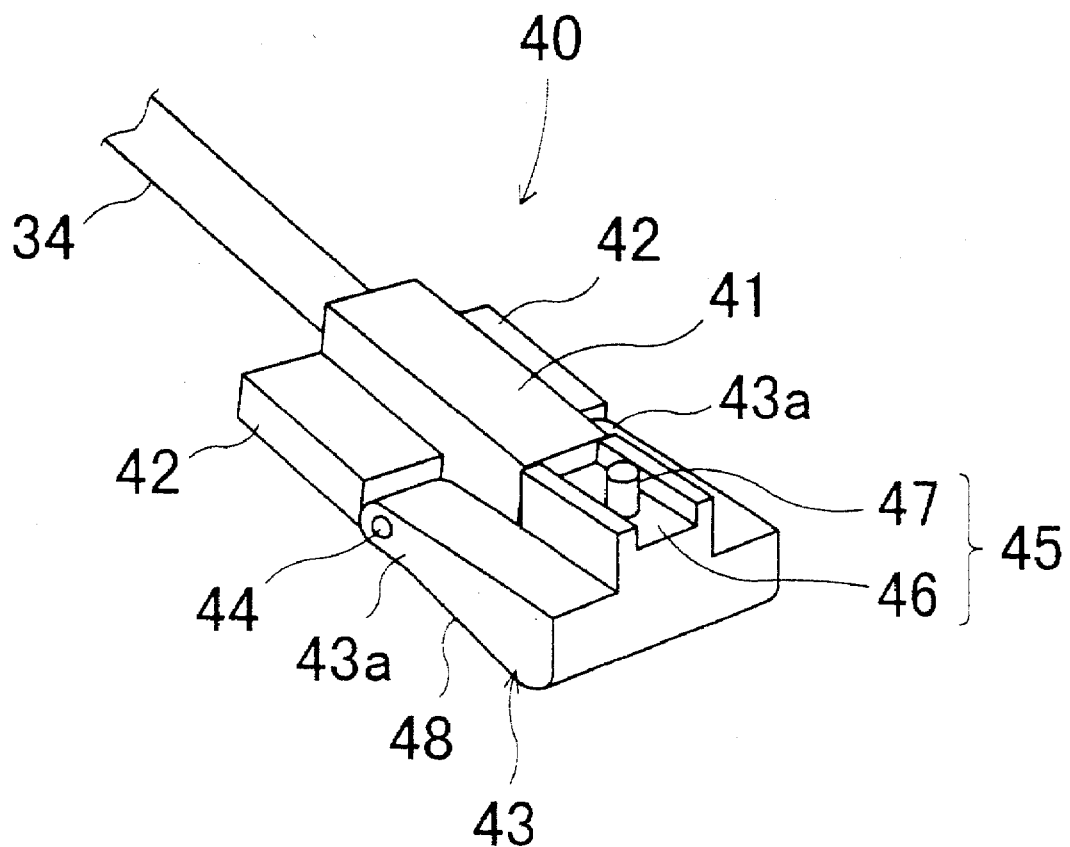
FIG. 8 is an enlarged perspective view showing the structure of a nut passing mechanism.

At the front end of the piston rod 34, there is mounted a nut passing mechanism 40 for passing a nut N to the movable electrode 4. As shown in FIG. 8, the nut passing mechanism 40 has a rectangular block 41. The block 41 is formed into one piece integral with a pair of cam block parts 42, 42 located on right and left sides of a rear-side lower portion of the block 41. At the front end of the block 41, a nut seat 43 is supported for putting and holding a nut N thereon in a welding position that projections N1, N1, ... are located on the lower side of the nut N. A seat face 45 of the nut seat 43 has a recess 46 which extends in a front-rear direction and fits the nut N therein to prevent its rotation, and a pin 47 which projects from the bottom center of the recess 46 and is capable of fitting into the hole N2 of the nut N. On the bottom surface of the nut seat 43, there is formed an inclined cam face 48 which is inclined downwardly toward the front.

The support of the nut seat 43 will be described. The nut seat 43 has a pair of arm parts 43a, 43a which extend rearward with the front end of the block 41 laterally interposed therebetween. The front end of the block 41 is positioned between both the arm parts 43a, 43a and both the arm parts 43a, 43a are connected to each other through a shaft 44. This arrangement makes the nut seat 43 swingable between a passing position that the seat face 45 is substantially horizontal and an escape position that the seat face 45 is dangled. Though not illustrated, a torsion spring (urging means) is arranged around the shaft 44 and urges to swing the nut seat 43 into its passing position.

Figure 9:
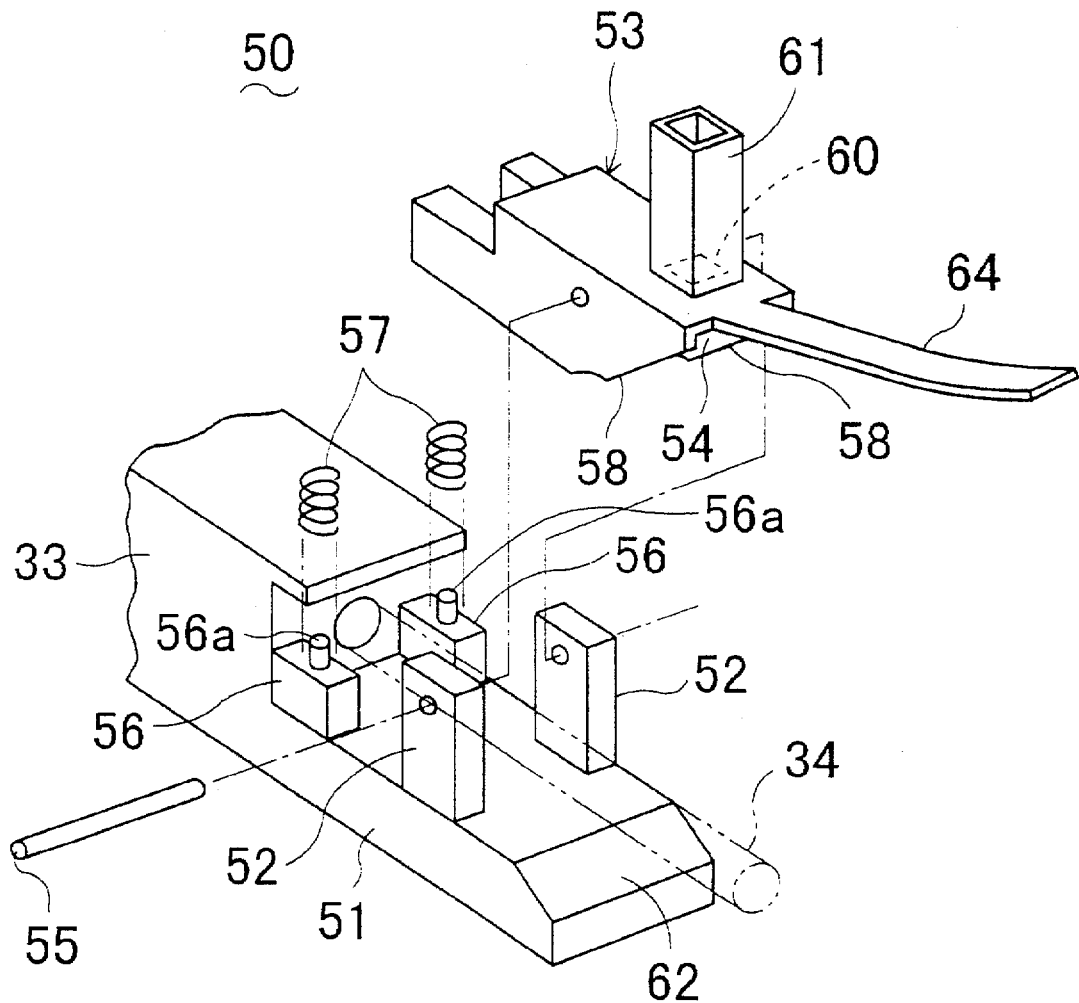
FIG. 9 is an enlarged and exploded perspective view showing the structure of a nut transfer mechanism.

The body 33 of the cylinder 32 is provided at a front end thereof with a nut transfer mechanism 50 for transferring a large number of nuts N, N, ... fed from a nut selecting apparatus located outside of the figure to the nut seat 43 of the nut passing mechanism 40 one by one. As shown in FIG. 9, the nut transfer mechanism 50 has a plate-like base 51 which extends frontward from the lower part of the front end of the cylinder body 33. Support parts 52, 52 are projectingly provided on right and left sides in the middle of the top surface of the base 51. Between both the support parts 52, 52, a swing member 53 is swingably supported through a horizontal shaft 55. The swing member 53 is a member having the form of C in section and is provided at the bottom surface thereof with a groove 54 which extends in a front-rear direction. The piston rod 34 is inserted in the groove 54.

On right and left sides of the rear end of the top surface of the base 51, spring seats 56, 56 having spring stop pins 56a, 56a formed thereon are projectingly provided. The lower end of a compression spring 57 is engaged by the spring stop pin 56a on each of the spring seats 56. The upper end of each compression spring 57 contacts the rear end of the bottom surface of the swing member 53. The compression spring 57 urges to swing the swing member 53 into its non-transfer position that the front end of the swing member 53 is faced downward.

At the front end of the bottom surface of the swing member 53, inclined cam faces 58, 58 which are inclined upwardly toward the front are formed. When the nut passing mechanism 40 retracts, the cam block parts 42, 42 on the right and left of the block 41 push the inclined cam faces 58, 58 of the swing member 53 so that the swing member 53 swings, against the urge of the compression spring 57, into a transfer position that the front end of the swing member 53 is faced upward.

At the front end of the top surface of the swing member 53, there is formed a nut inlet 60 which has a rectangular form in section and through which a nut N can pass in a position that directs the projections N1, N1, ... frontward. A tube fitting part 61 having a rectangular form in section projects from the nut inlet 60 upward. The tube fitting part 61 is for fitting thereon a feeding tube 59 (See FIG. 7) which has a rectangular form in section and extends from the nut selecting apparatus.

At the front end of the top surface of the base 51, there is formed an inclined cam face 62 which is inclined downwardly toward the front. When the nut passing mechanism 40 retracts, the inclined cam face 62 of the base 51 pushes the inclined cam face 48 of the nut seat 43 immediately before the nut passing mechanism 40 reaches its retracting most position, so that the nut seat 43 swings to a position that the front end is faced further upward than the passing position. Thereby, out of a large number of nuts N, N, ... fed into the swing member 53 through the nut inlet 60, the lowermost nut N is caught at the lower-side projections N1, N1 by the seat face 45 and is rotated, by the nut passing mechanism 40, into a welding position that the projections N1, N1, ... are located on the lower side of the nut N.

At the front end of the bottom surface of the groove 54 of the swing member 53, there is formed an inclined face 63 which is inclined downward from immediately behind the nut inlet 60. When the lowermost nut N is rotated by the motion of the nut seat 43 that swings further upward over the passing position, the nut seat 43 further rotates the nut N in association with the inclined face 63 and the nut N is transferred in a state that the nut hole N2 is engaged on the pin part 47 in the recess 46 of the seat face 45 of the nut seat 43.

The swing member 53 is provided at the front end thereof with a nut holding plate 64 formed of a leaf spring which extends frontward. When the nut N put on the seat face 45 of the nut seat 43 is moved forward to the movable electrode 4, the nut holding plate 64 pushes the nut N from above to slidably hold it thereby preventing the nut N from falling out of the seat face 45.

Operation of welding apparatus

Feeding of nut

Figure 10:
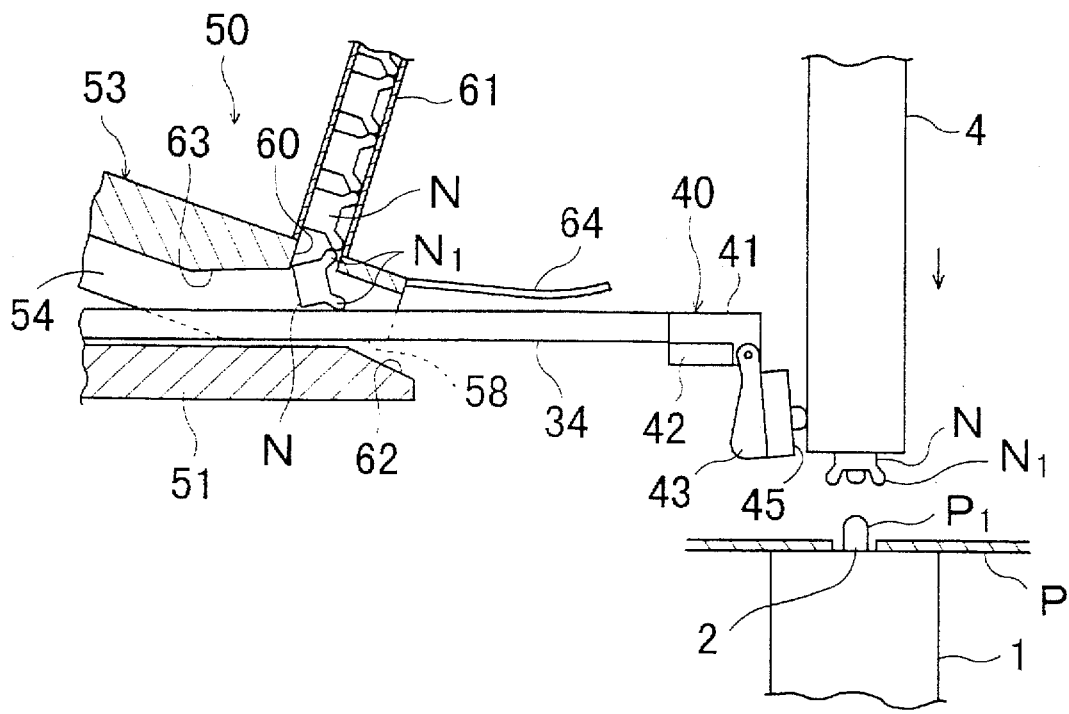
FIG. 10 is a front view showing a state immediately after the nut passing mechanism passes a nut to the movable electrode.
Figure 11:
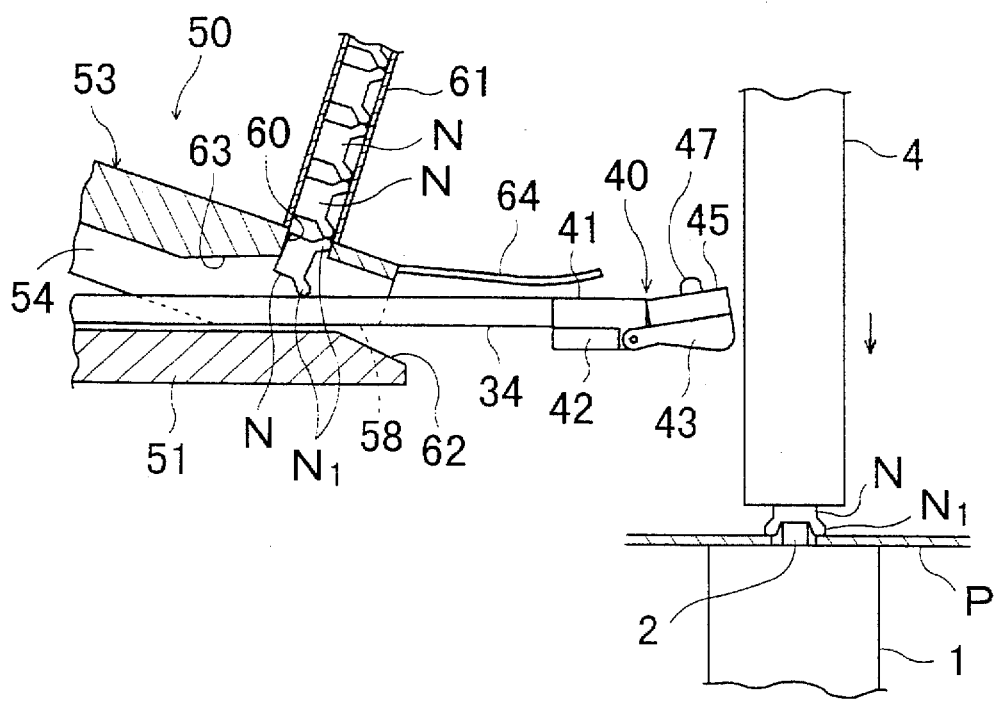
FIG. 11 is a front view showing a state that the movable electrode presses a nut onto a workpiece and the nut is welded thereon.

As shown in FIG. 10, supposed that the nut N has been now passed from the nut seat 43 to the movable electrode 4. The lowermost nut N in the swing member 53 stops in a state that contacts the piston rod 34. When the piston rod 34 retracts, as shown in FIG. 11, the lowermost nut N is drawn by the piston rod 34 to slightly rotate in a direction that the projections N1, N1, ... are located on the lower side of the nut N. When the nut passing mechanism 40 moves to a position close to its retracting most position, both the cam block parts 42, 42 on right and left sides of the block 41 push the inclined cam faces 58, 58 of the base 51 of the swing member 53 so that the swing member 53 swings from its non-transfer position to its transfer position against the urge of the compression springs 57, 57. At the time, the front end of the swing member 53 is faced upward so that both the front ends of the swing member 53 and the base 51 are made open therebetween.

Figure 12:
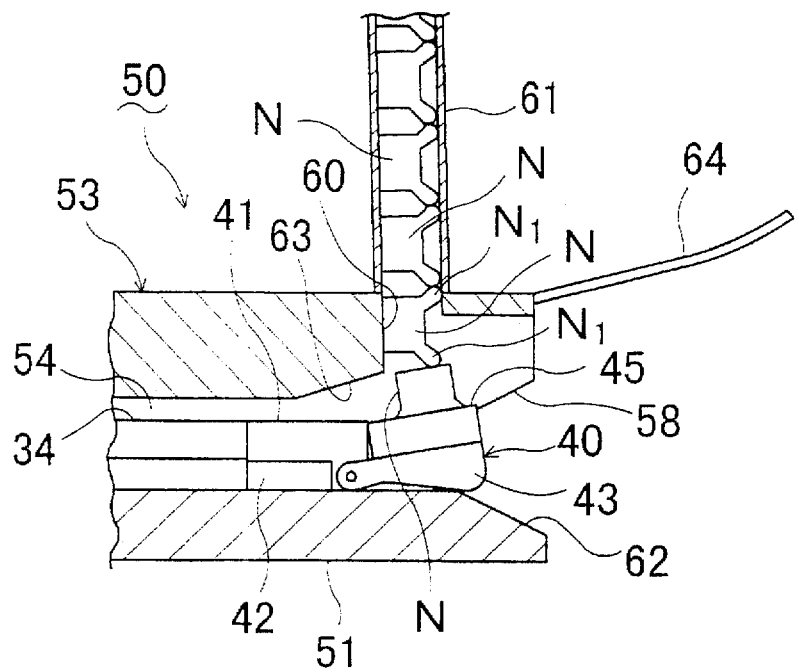
FIG. 12 is a cross section showing an operation of the nut transfer mechanism when the nut passing mechanism is in its retracting most position.

Thereafter, when the nut passing mechanism 40 reaches its retracting most position, as shown in FIG. 12, the inclined cam face 48 is pushed by the inclined cam face 62 at the front end of the base 51 so that the nut seat 43 swings in a direction that the front end thereof is faced further upward than the passing position. Thereby, the lowermost nut N in the swing member 53 is caught at the lower-side projections N1, N1 by the nut seat 43 to rotate in a direction that all the projections N1, N1, ... are located on the lower side of the nut N. Successively, the nut N is further rotated in such a manner that the rear upper end thereof is guided by the inclined face 63 at the bottom surface of the groove 54 of the swing member 53, so that the nut N takes a welding position that all the projections N1, N1, ... are located on the lower side of the nut N. In this position, the nut N is transferred to the seat face 45 of the nut seat 43 so that the nut hole N2 is engaged on the pin part 47 of the seat face 45. At this time, the nut N is fitted at its outer periphery in the recess 46 of the seat face 45 so as not to rotate around the nut hole N2. Accordingly, the transferred nut N is held in a state positioned in place.

Paralleling the transfer of the nut N to the nut passing mechanism 40, carried out are a fall of the movable electrode 4, a welding of the preceding nut N between the fixed electrode 1 and the movable electrode 4, a rise of the movable electrode 4 and a shift of a workpiece P on the fixed electrode 1 (insertion of the guide pin 2 of the fixed electrode 1 into the next nut mounting hole P1). Details of these operations are described later.

When the transfer of the nut N to the nut passing mechanism 40 is completed, the piston rod 34 is extended according to a welding instruction signal. When the piston rod 34 is extended, the block parts 42, 42 of the passing mechanism 40 are disengaged with the cam faces 58, 58 of the swing member 53. As a result, the swing member 53 swings from its transfer position to its non-transfer position so that the front end of the swing member 53 is faced downward. Accordingly, the nut holding plate 64 provided at the front of the swing member 53 pushes the nut N on the nut seat 43 from above, thereby preventing the nut N from falling out of the seat face 45.

Fall of movable electrode

Figure 13:
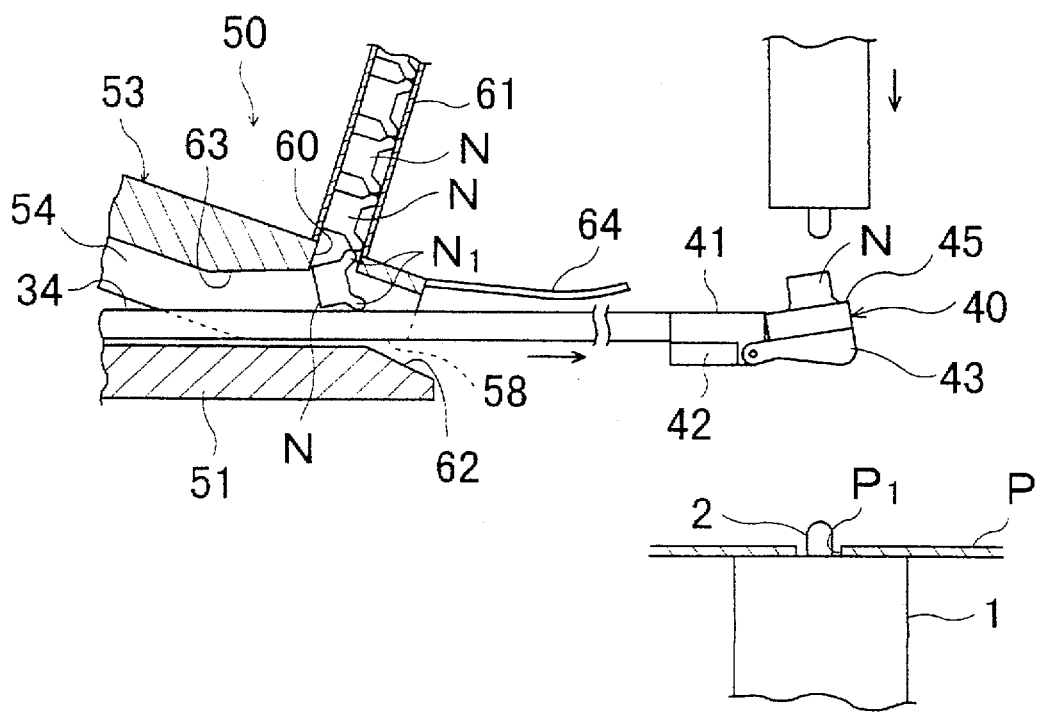
FIG. 13 is a cross section showing a state that the nut passing mechanism is in its extending most position immediately before the nut is passed to the movable electrode.

As shown in FIG. 13, when the nut seat 43 on which the nut N is put and held reaches below the movable electrode 4, the movable electrode 4 immediately falls. At this time, since a pressurized air from the air supply is supplied to the cylinder part 6 of the movable electrode 4, the top surface of the guide pin 7 receives the pressurized air so that the lower part of the guide pin 7 protrudes from the electrode body 5 against the urge of the spring 19. Further, a part of the pressurized air passes through the air passage 20 of the guide pin 7 and then blows out of the air outlets 21 on the outer periphery of the guide pin 7, while another part of the pressurized air passes through the small clearance 10 between the guide pin head 7a and the inner periphery of the cylinder part 6 and then blows out of the lower end of the cylinder part 6.

In the above conditions, when the movable electrode 4 falls close to the nut seat 43, dusts deposited on the lower end of the cylinder 6, dusts on the nut N put on the seat face 45 of the nut seat 43 and dusts on the surroundings are blown off by the air from the lower end of the cylinder part 6. When the movable electrode 4 further falls, the guide pin 7 is fitted into the hole N2 of the nut N as shown in FIG. 4. When the movable electrode 4 further continues to fall, the nut seat 43 is pushed by the electrode tip 18 to swing into its escape position. The movable electrode 4 further continues to fall without any interference with the nut seat 43 to position the nut N onto a portion to be welded of the workpiece P.

When the movable electrode 4 falls with the guide pin 7 inserted in the nut N, the bottom surface of the nut N is supported by the pressurized air blown up from the air outlets 21, 21 located on the outer periphery of the tip of the guide pin 7 thereby preventing the nut N from falling out of the guide pin 7. For the air blow, the guide notches 21a make the air ease to flow upward. This advantageously acts on the prevention of fallout of the nut N. Accordingly, even when the falling speed of the movable electrode 4 is smaller than the speed of free fall, the nut N can be prevented from falling out of the guide pin 7. As a result, the falling speed of the movable electrode 4 can be set at a speed suitable for the receipt of the nut N from the nut seat 43 and for the positioning of the nut N to the workpiece P.

Welding of nut

As shown in FIG. 11, when the movable electrode 4 moves down to its falling most position so that the nut N reaches a position to be welded of the workpiece P, the supply of a pressurized air to the cylinder part 6 is cut off. Thereby, the guide pin 7 retracts in the cylinder part 6 so that the tip of the guide pin 2 of the fixed electrode 1 is slightly inserted in the hole N2 of the nut N. The nut N becomes a pressed state that the projections N1, N1, ... are pushed on the surroundings of the mounting hole P1 of the workpiece P by the movable electrode 4. The nut N is then welded on the workpiece P in such a manner that the projections N1, N1, ... are melt by the passage of a welding current through both the electrodes 1, 4. During the welding, the piston rod 34 of the nut feeding unit 31 retracts for the supply of the next nut N in the above-mentioned manner.

Rise of movable electrode

When the welding is completed, the movable electrode 4 rises. The workpiece P may be concurrently lifted and shifted sideward so as to be positioned to the next welding point. Even in this case, the welded nut N does not interfere with the guide pin 7 because the guide pin 7 has already retracted in the cylinder part 6. Accordingly, the shift of the workpiece P can be performed promptly and smoothly.

Thereafter, the above operations are repeated so that a large number of nuts N are sequentially welded.

What is claimed is:

1. A resistance welding apparatus for a nut comprising a fixed electrode, a movable electrode placed above the fixed electrode and nut feeding means for feeding the nut to a position between the fixed and movable electrodes, the movable electrode including a guide pin which protrudes downward to be inserted into a hole of the nut, the nut feeding means including a nut seat swingable between a position that a seat face for holding the nut is substantially horizontal and a dangled position and urging means for urging the nut seat into the position that the seat face is substantially horizontal, in which when the nut is held on the nut seat of the nut feeding means and is fed to the position between the fixed and movable electrodes, the movable electrode is moved down to insert the guide pin into the hole of the nut, forcedly dangle the nut seat and then position the nut on a portion to be welded of a workpiece overlying the fixed electrode, a movable electrode structure of the resistance welding apparatus comprising:
an air passage which is formed inside of the guide pin and through which pressurized air is supplied;
a plurality of air outlets which extend from the air passage to respective openings on a periphery of a tip of the guide pin and through which air blows are given to a bottom surface of the nut to prevent the nut from falling off of the guide pin; and
an air supply which is connected to the movable electrode and supplies pressurized air to the air passage of the guide pin.

2. A movable electrode structure of a resistance welding apparatus for a nut according to claim 1, further comprising:
an electrode body capable of contact with a top surface of the nut;
a cylinder part which is formed at a lower part of the electrode body, has an opening formed on a bottom surface of the electrode body and houses the guide pin in such a way that the guide pin is retractable in and protrudable from the opening; and urging means for urging to retract the guide pin in the cylinder part, wherein a pressurized-air inlet through which pressurized air is supplied to the air passage of the guide pin is formed on the top surface of the guide pin, and the air supply is connected to the cylinder part and supplies pressurized air to the top surface of the guide pin to protrude the guide pin from the opening at a lower end of the cylinder part against the urge of the urging means.

3. A movable electrode structure of a resistance welding apparatus for a nut according to claim 2, wherein a small clearance is formed between an outer periphery of the guide pin and the inner periphery of the cylindrical part so that a part of the pressurized air passes therethrough and is then blown out of the opening at the lower end of the cylinder part.

* * * * *